(12) United States Patent
Lundberg et al.

(10) Patent No.: US 6,251,317 B1
(45) Date of Patent: Jun. 26, 2001

(54) METHOD FOR MANUFACTURING A CERAMIC COMPOSITE MATERIAL

(75) Inventors: Robert Lundberg; Magnus Holmquist, both of Trollhättän (SE); Anthony G. Razzell, Derbyshire (GB); Ludovic Molliex, Paris (FR); Olivier Sudre, Arcueil (FR); Michel Parlier, Voisins-le-Brettonneux (FR); Fabrice Rossignol, Lourdoueix-Saint-Michel (FR); Julien Parmentier, Colmar (FR)

(73) Assignees: Volvo Aero Corporation, Trollhattan (SE); Rolls Royce PLC, Derby (GB); Societe Nationale d'Etude et de Construction de Moteurs d'Aviation, Paris Cedex; Office National d'Etudes et de Recherches Aerospatiales, Chatillon, both of (FR)

( * ) Notice: Subject to any disclaimer, the term of this patent is extended or adjusted under 35 U.S.C. 154(b) by 0 days.

(21) Appl. No.: 09/284,221
(22) PCT Filed: Aug. 11, 1997
(86) PCT No.: PCT/SE97/01340
  § 371 Date: Jan. 13, 2000
  § 102(e) Date: Jan. 13, 2000
(87) PCT Pub. No.: WO99/07653
  PCT Pub. Date: Feb. 18, 1999

(51) Int. Cl.$^7$ .................................................. B29C 65/00
(52) U.S. Cl. ............................................... 264/44; 264/642
(58) Field of Search .................................. 264/42, 43, 44, 264/640, 641, 642

(56) References Cited

U.S. PATENT DOCUMENTS

| | | |
|---|---|---|
| 4,732,877 | 3/1988 | Olsson et al. . |
| 4,885,199 | * 12/1989 | Corbin et al. ........................ 428/113 |
| 5,290,491 | 3/1994 | Heraud et al. . |
| 5,622,751 | * 4/1997 | Thebault et al. .................. 427/376.2 |

* cited by examiner

Primary Examiner—Christopher A. Fiorilla
(74) Attorney, Agent, or Firm—Ostrolenk, Faber, Gerb & Soffen, LLP

(57) ABSTRACT

The present method of manufacturing a ceramic composite material, composed of matrix and reinforcing materials and an intermediate weak interface material, creates a composite material particuarly intended for use at temperatures above 1400° C. and in an oxidizing environment. The matrix and reinforcing materials consist of the same or different ceramic oxides having a melting point above 1600° C. The interface material provides in combination with the matrix and reinforcing materials a stress field liable to micro aciding. The reinforcing material is immersed into a powder slurry containing carbon (C) and $ZrO_2$ so as to be coated thereby and then dried. After which, the thus created composite material is subjected to green forming and densifying steps. Finally, the composite material undergoes a heat-treatment in air leaving a porous structure of the interface material.

3 Claims, No Drawings

METHOD FOR MANUFACTURING A CERAMIC COMPOSITE MATERIAL

This application claims the benefit of PCT Application Serial No. PCT/SE97/01340, filed Aug. 11, 1997.

BACKGROUND OF THE INVENTION

1. Field of the Invention

The present invention refers to a method of manufacturing a ceramic composite material comprising matrix and reinforcing materials and an intermediate weak interface material, said composite material being particularly intended for use at temperatures above 1400° C. and in an oxidizing environment, the matrix and reinforcing materials consisting of the same or different ceramic oxides having a melting point above 1600° C., and the interface material providing in combination with said materials a stress field liable to micro-cracking.

2. Description of the Related Art

For obtaining an intentional cracking behaviour of such ceramic composites various suggestions have been made, for instance according to WO 93/22258 to the Applicant. In practice, however, it has turned out that an interface layer of $ZrO_2$ provides a bonding which mostly is too strong. On the other hand, carbon provides a suitably weak bonding between the reinforcing material and the matrix but degrades the fiber material. Over $ZrO_2$ also $HfO_2$ fulfills the requirements as to a weak interface zone but in many connections a still weaker interface is desirable.

SUMMARY OF THE INVENTION

Therefore, the main object of the present invention is to suggest a method by which an even weaker interface is obtained. In one aspect of the invention, the reinforcing fiber material is immersed into a powder slurry containing carbon and $ZrO_2$ so as to be coated thereby and then dried, after which the composite material is subjected to green forming and densification steps as known per se, and finally a heat-treatment in air leaving a porous structure of the interface material. In another aspect of the invention, the reinforcing fiber material is immersed into and coated with a first powder slurry contain WO ing $ZrO_2$ and then dried and immersed into and coated with a second powder slurry containing carbon and dried, after which the composite material is subjected to green forming and densification steps as known per se, and finally a heat-treatment in air leaving a gap between the reinforcing material and the matrix. It is advantageous to use a powder slurry technique, in which thus rather great particles are used which create a stable porous layer when a coating is used including $C/ZrO_2$.

By the present invention it is thus possible to obtain a weak interface securing the necessary crack deflection and fiber pullout behaviour during fracture of the composite.

The coating formed on fibers of which the reinforcing material consist and which are immersed in the slurry has proved to be adherent and strong enough to survive green forming and densification processes. After densification the C is removed by heat treatment in air, leaving a gap or porosity in the oxide interface. The volume fraction of C can be varied to achieve the desired interface strength. The interface made by this invention is stable at high temperatures for long times because the pores have got the right size, i.a. are large enough.

According to the further aspect of the invention, there is provided, however, another way to obtain an interface weak enough, namely to add a fugitive layer. In this method, the reinforcement is first immersed in a C powder slurry, dried and then immersed in an oxide ($ZrO_2$) powder slurry, forming a double or sequential coating. Again, this coating is strong and adherent enough to survive green forming and densification. After densification the C is removed by heat treatment leaving a gap between the reinforcing material and the oxide interface. Surface roughness of the reinforcing and matrix materials is sufficient to give load transfer between reinforcing material and matrix material. The absence of bonding between the oxide interface and the reinforcing material will ensure effective crack deflection. The degree of load transfer and frictional sliding resistance between reinforcing material and matrix controlling the fiber pullout behaviour can be varied by varying the thickness of the fugitive C layer.

The presence of an oxide interface will prevent a possible carbothermal reduction of the surface of the reinforcing fiber material of single crystal $Al_2O_3$ fibers (to $Al_4C_3$) which would degrade the mechanical properties by defects-created. The presence of oxide interface (especially in the case of a $C/ZrO_2$ mixture) will locally raise the partial pressure of oxygen and thus prevent the carbothermal reduction to take place.

DETAILED DESCRIPTION OF THE PREFERRED EMBODIMENTS

EXAMPLE 1

Single crystal fibers of $Al_2O_3$ (from Saphikon Inc., USA) were covered with a thin layer of $C/ZrO_2$ mixture. This was made by immersing the fibers in a slurry of $C/ZrO_2$-powder in water. The volume proportions of C to $ZrO_2$ was ¼. After drying the coated fibers were stacked to a fiber preform in a plaster mould. A $Al_2O_3$ powder slurry was poured thereon and a pressure gradient was applied to give good infiltration of the fiber preform.

After drying the green bodies were sintered by hot-pressing at 1400° C., 10 MPa for 70 minutes. The C was burnt out by heat treatment at 1250° C. for 10 hours leaving a porous $ZrO_2$ layer. After sintering and heat treatment the porous ZrO2 was about 3 μm thick. The porous $ZrO_2$ layer provided crack deflection and fiber pullout which was proved by bending tests. Furthermore, the porous $ZrO_2$ layer was stable at 1400° C. for 1000 hours and still provided crack deflection and fiber pullout after this heat treatment which was proved by bending tests.

EXAMPLE 2

Example 1 was repeated however using $HfO_2$ instead of $ZrO_2$.

EXAMPLE 3

Single crystal fibers of $Al_2O_3$ (from Saphikon Inc., USA) were covered with at thin double layer of C and $ZrO_2$. This was made by first immersing the fibers in a slurry of $ZrO_2$-powder in water and then immersing the fibers in a slurry of C-powder in water. After drying the coated fibers were stacked to a fiber preform in a plaster mold. An $Al_2O_3$ powder slurry was poured thereon and a pressure gradient was applied to give good infiltration of the fiber preform.

After drying the green bodies were sintered by hot-pressing at 1400° C., at 10 MPa for 70 minutes. The C was burnt out by heat treatment at 1250° C. for 10 hours leaving a gap of about 1 μm between the zirconia layer and the $Al_2O_3$ matrix. After sintering and heat treatment the $ZrO_2$ layer was about 3 μm of thickness and not bonded to the matrix. The gap between fiber and $ZrO_2$ layer provided crack deflection and fiber pullout which was proved by bending tests. (Furthermore, the $ZrO_2$ layer was stable at 1400° C. for 1000 hours and still provided crack deflection and fiber pullout after this heat treatment which was proved by bending tests.)

EXAMPLE 4

Example 3 was repeated however using $HfO_2$ instead of $ZrO_2$.

EXAMPLE 5

Example 3 was repeated, however with the steps in slightly reversed order, i.e. by first immersing the fibers in a slurry of C-powder in water and then in a slurry of $ZrO_2$powder, with similar advantageous result.

What is claimed is:

1. A method for manufacturing a ceramic composite material comprising matrix and reinforcing materials and an intermediate weak interface material, said composite material being particularly intended for use at temperatures above 1400° C. and in an oxidizing environment, the matrix and reinforcing materials consisting of the same or different ceramic oxides having a melting point above 1600° C., and the interface material providing in combination with said matrix and reinforcing materials a stress field liable to micro-cracking, comprising:

immersing the reinforcing material in a powder slurry containing carbon (C) and $ZrO_2$ so as to be coated thereby, thereby creating said composite material;

drying said composite material;

green forming and densifying said composite material; and heat-treating said composite material in air leaving a porous structure of the interface material.

2. A method for manufacturing a ceramic composite material comprising matrix and reinforcing materials and an intermediate weak interface material, said composite material being particularly intended for use at temperatures above 1400° C. and in an oxidizing environment, the matrix and reinforcing materials consisting of the same or different ceramic oxides having a melting point above 1600° C. and the interface material providing in combination with said matrix and reinforcing materials a stress field liable to micro-cracking, comprising:

immersing the reinforcing material in and coating the reinforcing material with a first powder slurry containing $ZrO_2$ immersing the reinforcing material in and coating the reinforcing material with a second powder slurry containing carbon, thereby creating said composite material;

drying the reinforcing material;

green forming and densifying said composite material; and heat-treating said composite material in air leaving a gap between the reinforcing material and the matrix.

3. A method according to claim 2, further comprising immersing the reinforcing material, after said immersing the reinforcing material in and coating the reinforcing material with a second powder slurry, into the first slurry so as to be provided with an outermost $ZrO_2$ coating.

* * * * *